(12) United States Patent
Ai et al.

(10) Patent No.: US 11,136,274 B2
(45) Date of Patent: Oct. 5, 2021

(54) METHOD FOR PREPARING ORGANIC MANGANESE FERTILIZER FOR ENGINEERING WOUND SOIL REMEDIATION AND ORGANIC MANGANESE FERTILIZER PREPARED

(71) Applicant: Sichuan University, Sichuan (CN)

(72) Inventors: Yingwei Ai, Sichuan (CN); Xiaoyan Ai, Sichuan (CN); Jianjun Rong, Sichuan (CN); Xue Jiang, Sichuan (CN); Wei Li, Sichuan (CN); Meihua Sheng, Sichuan (CN)

(73) Assignee: Sichuan University, Sichuan (CN)

( * ) Notice: Subject to any disclaimer, the term of this patent is extended or adjusted under 35 U.S.C. 154(b) by 139 days.

(21) Appl. No.: 16/560,832

(22) Filed: Sep. 4, 2019

(65) Prior Publication Data
US 2020/0010378 A1   Jan. 9, 2020

(30) Foreign Application Priority Data
Oct. 22, 2018   (CN) .......................... 201811228625.8

(51) Int. Cl.
| C05F 3/00 | (2006.01) |
| C05F 11/00 | (2006.01) |
| C05D 9/02 | (2006.01) |
| C05G 3/80 | (2020.01) |
| C01G 45/02 | (2006.01) |

(52) U.S. Cl.
CPC ................ C05F 3/00 (2013.01); C01G 45/02 (2013.01); C05D 9/02 (2013.01); C05F 11/00 (2013.01); C05G 3/80 (2020.02)

(58) Field of Classification Search
None
See application file for complete search history.

(56) References Cited

U.S. PATENT DOCUMENTS

| 2013/0102465 A1* | 4/2013 | Lovatt ..................... C05B 17/00 |
| | | 504/136 |
| 2017/0238546 A1* | 8/2017 | Teeranitayatarn ........ C05D 3/00 |
| 2020/0131096 A1* | 4/2020 | Kanagalingam ........ C05F 17/20 |
| 2021/0068401 A1* | 3/2021 | Lutfiyya .................. C05G 3/60 |

* cited by examiner

*Primary Examiner* — Wayne A Langel

(57) ABSTRACT

A method for preparing an organic manganese fertilizer for engineering wound soil remediation includes a step of: effectively compounding chitin oligosaccharide or/and wormcast or/and silkworm excrement, water or/and hydrogen peroxide, an organic manganese element solution, polysorbate and sodium carboxymethyl cellulose under certain conditions. The present invention has significant effects on improving physical and chemical properties of engineering wound soil, enhancing availability of manganese element in the soil, preventing plants from physiological diseases caused by lack of manganese, and promoting growth and development of the plants.

1 Claim, No Drawings

METHOD FOR PREPARING ORGANIC MANGANESE FERTILIZER FOR ENGINEERING WOUND SOIL REMEDIATION AND ORGANIC MANGANESE FERTILIZER PREPARED

CROSS REFERENCE OF RELATED APPLICATION

The present invention claims priority under 35 U.S.C. 119(a-d) to CN 201811228625.8, filed Oct. 22, 2018.

BACKGROUND OF THE PRESENT INVENTION

Field of Invention

The present invention relates to a fertilizer, and most particularly related to a method for preparing an organic manganese fertilizer for engineering wound soil remediation and the corresponding organic manganese fertilizer prepared.

Description of Related Arts

In the engineering construction processes of highway, railway, water conservancy, mine and electric power, with lots of mountains being excavated, the original soil vegetation is detached by the overburden, causing a large number of bare engineering wounds. The engineering wounds generated due to the engineering construction have direct or indirect influences on the various ecological processes in the original habitats, and the influence scale thereof extends from populations to landscapes. Because the engineering wounds have one or more special habitats, such as petrifaction, barren land, high-steep slope, and lack of native vegetation, the ecological functions thereof are difficult to be naturally recovered. For the engineering wounds with very special habitats, soil remediation measures that use soil to pile up on the engineering wounds and carry out vegetation reconstruction in a specific way are effective ways for modern engineering wound management and ecological greening (as described in Chinese patent ZL 200810046488.6, and Chinese patent ZL 201510620706.2). Manganese is an essential microelement for plants. The application of manganese fertilizers is a fundamental measure to improve the soil fertility and ensure the manganese nutrition supply to the plants. However, due to the lack of targeted and effective organic manganese fertilizers, the common manganese fertilizers purchased on the market for farmland soil are still applied in the process of engineering wound soil remediation, facing a series of production problems, such as unreasonable fertilizer application, uncoordinated nutrient supply, and low fertilizer utilization rate. As a result, the effects of soil fertilizing and vegetation recovering on the engineering wounds are not obvious.

SUMMARY OF THE PRESENT INVENTION

An object of the present invention is to provide a method for preparing an organic manganese fertilizer for engineering wound soil remediation and the organic manganese fertilizer prepared, so as to overcome shortcomings in the prior art. The present invention has characteristics of easily available raw materials, low production cost, stable performance, lasting fertilizer effect and high bio-availability. The present invention has significant effects on improving physical and chemical properties of engineering wound soil, enhancing availability of manganese element in the soil, preventing plants from physiological diseases caused by lack of manganese, and promoting growth and development of the plants.

In order to accomplish the above object, the present invention adopts technical solutions as follows.

A method for preparing an organic manganese fertilizer for engineering wound soil remediation comprises steps of:

(1) adding at least one of chitin oligosaccharide, wormcast and silkworm excrement, with a weight percentage of 35%-65%, into a reaction kettle; then adding at least one of water and hydrogen peroxide, with a weight percentage of 35%-65%, into the reaction kettle for dissolution; stirring at 30-90° C. for 0.3-2 hours, and obtaining a sample 1;

(2) adding at least one of mercaptoacetic acid, glutamic acid and citric acid, with a weight percentage of 10%-40%, into the reaction kettle; dissolving by water with a weight percentage of 15%-40%; then adding at least one of hydrogen peroxide, ethyl alcohol and triethanolamine, with a weight percentage of 0.5%-9.5%, into the reaction kettle for dissolution; stirring at 30-90° C. for 0.3-2 hours; adding manganese sulfate with a weight percentage of 30%-70% into the reaction kettle; boiling at 90-130° C. for 0.5-4 hours, and obtaining a sample 2; and (3) compounding the sample 1, the sample 2, polysorbate and sodium carboxymethyl cellulose respectively with weight percentages of 5%-35%, 60%-95%, 0-3% and 0-2%, and obtaining a final product.

An organic manganese fertilizer for engineering wound soil remediation, which is prepared through the above method, comprises components of: a sample 1, a sample 2, polysorbate and sodium carboxymethyl cellulose, wherein: the sample 1 comprises at least one of chitin oligosaccharide, wormcast and silkworm excrement, and at least one of water and hydrogen peroxide; the sample 2 comprises at least one of mercaptoacetic acid, glutamic acid and citric acid, water, at least one of hydrogen peroxide, ethyl alcohol and triethanolamine, and manganese sulfate.

The present invention has following beneficial effects.

The present invention overcomes the shortcomings in the prior art and has the characteristics of easily available raw materials, low production cost, stable performance, lasting fertilizer effect and high bio-availability. The present invention has significant effects on improving physical and chemical properties of engineering wound soil, enhancing availability of manganese element in the soil, preventing plants from physiological diseases caused by lack of manganese, and promoting growth and development of the plants.

DETAILED DESCRIPTION OF THE PREFERRED EMBODIMENT

The present invention will be further illustrated with preferred embodiments.

First Preferred Embodiment

Adding chitin oligosaccharide with a weight percentage of 50% into a reaction kettle; then adding water with a weight percentage of 50% into the reaction kettle for dissolution; stirring at 80° C. for 0.3 hours, and obtaining a chitin oligosaccharide solution. Adding mercaptoacetic acid with a weight percentage of 25% into the reaction kettle; dissolving by water with a weight percentage of 30%; then adding hydrogen peroxide with a weight percentage of 5% into the reaction kettle for dissolution; stirring at 80° C. for 0.3 hours; adding manganese sulfate with a weight percentage of 40% into the reaction kettle; boiling at 100° C. for 0.5 hours, and obtaining an organic manganese element solution. Compounding the chitin oligosaccharide solution, the organic manganese element solution, polysorbate and sodium carboxymethyl cellulose respectively with weight percentages of 9%, 89%, 0.8% and 1.2%; and, obtaining a final product.

The obtained organic manganese fertilizer of the present invention was applied in engineering wound soil remediation, and a vegetation recovery comparative experiment was carried out by using Festuca arundinacea. The comparative experiment showed that: compared with Foliwell manganese fertilizer (developed by Omex Agrifluids Ltd., England) and a control group without manganese fertilizer, the organic manganese fertilizer of the present invention can promote the growth and development of Festuca arundinacea, significantly increase the chlorophyll content of Festuca arundinacea, and decrease the proportion of grey-speck seedlings caused by manganese deficiency of Festuca arundinacea, thereby achieving a good vegetation recovery effect (see Table 1).

TABLE 1

Influence of organic manganese fertilizer of present invention on growth and development of Festuca arundinacea in engineering wounds

| Treatment | Plant height (cm) | Chlorophyll content (mg/cm$^2$) | Grey-speck seedling proportion (%) | Vegetation coverage (%) |
|---|---|---|---|---|
| Control group without manganese fertilizer | 98 | 0.026 | 71.3 | 90 |
| Commercial manganese fertilizer (Foliwell manganese fertilizer) | 103 | 0.035 | 30.1 | 95 |
| Organic manganese fertilizer of present invention | 112 | 0.046 | 8.6 | 100 |

Second Preferred Embodiment

The operating procedure during preparation is the same as that in the first preferred embodiment. However, type, quantity and dissolution temperature of the raw materials, stirring time, and boiling time are changed within the range specified by the operating procedure of the present invention. As a result, the organic manganese fertilizer for engineering wound soil remediation of the present invention is also prepared.

What is claimed is:

1. A method for preparing an organic manganese fertilizer for engineering wound soil remediation, comprising steps of:
   (1) adding at least one member selected from a group consisting of chitin oligosaccharide, wormcast and silkworm excrement, with a weight percentage of 35%-65%, into a reaction kettle; then adding at least one member selected from a group consisting of water and hydrogen peroxide, with a weight percentage of 35%-65%, into the reaction kettle for dissolution; stirring at 30-90° C. for 0.3-2 hours, and obtaining a sample 1;
   (2) adding at least one member selected from a group consisting of mercaptoacetic acid, glutamic acid and citric acid, with a weight percentage of 10%-40%, into the reaction kettle; dissolving by water with a weight percentage of 15%-40%; then adding at least one member selected from a group consisting of hydrogen peroxide, ethyl alcohol and triethanolamine, with a weight percentage of 0.5%-9.5%, into the reaction kettle for dissolution; stirring at 30-90° C. for 0.3-2 hours; adding manganese sulfate with a weight percentage of 30%-70% into the reaction kettle; boiling at 90-130° C. for 0.5-4 hours, and obtaining a sample 2; and
   (3) compounding the sample 1, the sample 2, polysorbate and sodium carboxymethyl cellulose respectively with weight percentages of 5%-35%, 60%-95%, 0-3% and 0-2%, and obtaining a final product.

* * * * *